Oct. 1, 1929.   T. J. STEPHENS   1,729,903
DISPENSING CONTAINER FOR LIQUIDS
Filed July 12, 1926
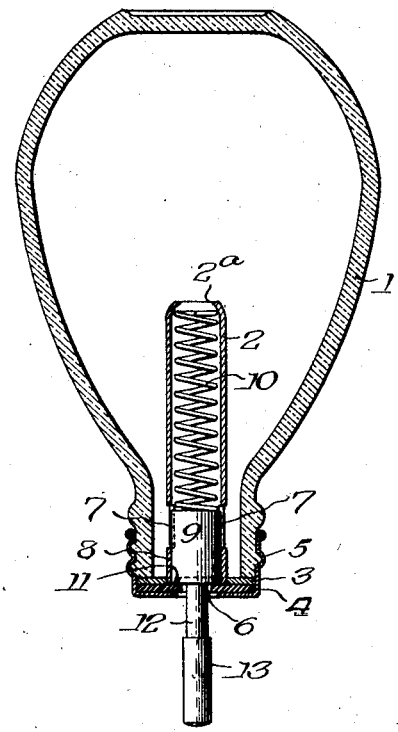
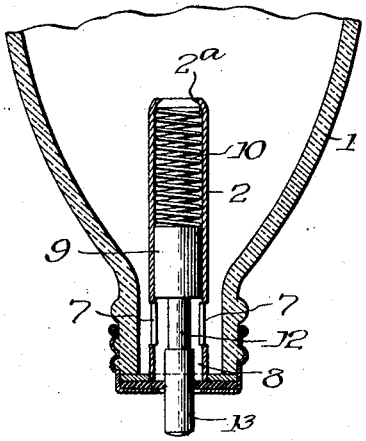
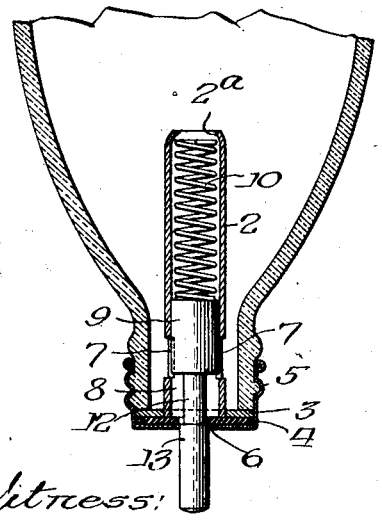
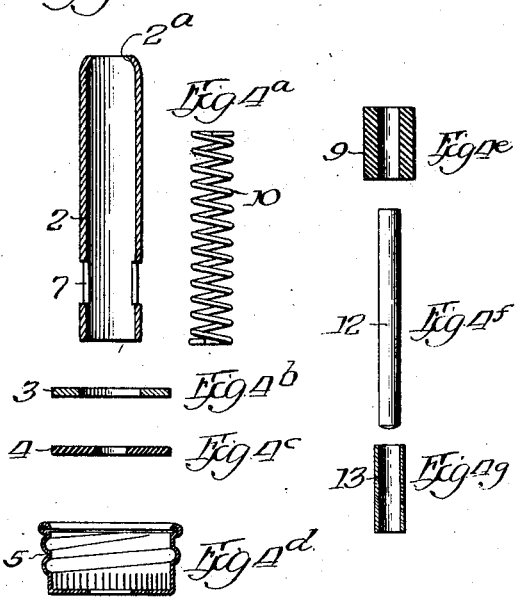
Inventor
Thomas J. Stephens

Patented Oct. 1, 1929

1,729,903

UNITED STATES PATENT OFFICE

THOMAS J. STEPHENS, OF CHICAGO, ILLINOIS, ASSIGNOR TO STEPHENS COMPANY (NOT INCORPORATED), A FIRM CONSISTING OF THOMAS J. STEPHENS, VERNON A. WHITE, AND JOHN L. KLEPPINGER, OF CHICAGO, ILLINOIS

DISPENSING CONTAINER FOR LIQUIDS

Application filed July 12, 1926. Serial No. 121,856.

This invention relates to a dispensing device to be applied to containers of fluid, such as lotions or other liquid medicaments, liquid soaps, etc., and which, in response to a manipulation, will deliver a quantity of the fluid suitable for an individual application for the purpose for which it is intended; and the invention relates particularly to a dispensing device embodying in its organization a piston working in a cylindrical measuring chamber having intake and discharge ports controlled by the piston.

One object of the invention is to provide a dispensing device of the class described which will positively introduce the fluid into the measuring chamber, trap a predetermined quantity thereof within the chamber, and positively expel the charge so measured, as distinguished from permitting the fluid to enter the measuring chamber and escape therefrom by gravity, and therefore with the measure of the charge and promptness of its delivery variably influenced by viscosity, atmospheric temperature, or other conditions.

Another object of the invention is to provide a construction of dispensing device in which the controlling piston will positively introduce, through the dispensing device into the container, a volume of air corresponding to the volume of fluid to be withdrawn, thereby facilitating entry of the fluid into the measuring chamber and permitting use of a hermetically sealed and therefore more sanitary container for the fluid.

Still another object is to provide a dispensing device of the type employing a pumping cylinder and piston-controlled inlet and outlet ports, in which the piston has a suction stroke during the fore part of which it sucks in a measured displacing charge of air through the fluid discharge port, whereupon the discharge port is closed and the intake port is opened, then, during the latter part of its suction stroke, positively sucks the fluid into the measuring chamber with displacement of the trapped air, and then, by the fore part of its return stroke, closes the intake port and traps the measured charge of fluid, whereupon the discharge port opens and the piston, by the remainder of its return stroke, positively expels the fluid into the hand of the user, and seats itself over the discharge port to seal the container.

An important feature of the invention resides in the differential diameters of the pumping piston and the port closing enlargement on the piston rod, since equal diameters in these parts would have the effect of defeating pumping action or suction influence upon the fluid, and convert the piston into a mere trapping valve dependent on gravity alone for introduction of the more or less viscous or sluggishly fluid material.

In the accompanying drawings—

Figure 1 is a vertical axial section of an inverted bottle suitable for containing a lotion or other fluid, with a dispensing device embodying the present invention applied thereto, the piston being seated.

Figure 2 is a view similar to Figure 1 with a portion of the container broken away, and with the piston at the upper end of its stroke.

Figure 3 is a similar view showing an intermediate position of the piston in either its upward or suction stroke, or its downward and expelling stroke.

Figures 4 to $4^g$, inclusive, are views in vertical section or elevation, of parts which are preferably employed in cheaply producing in durable form, a dispensing device embodying the invention; Figure 4 showing the cylinder; Figure $4^a$ the return spring; Figure $4^b$ the flange which is permanently united to the end of the cylinder which serves to mount it upon the container; Figure $4^c$ the separable disk which constitutes the cylinder head with its reduced dispensing port; Figure $4^d$ the screw cap for securing the dispenser to the bottle; Figure $4^e$ the piston; Figure $4^f$ the piston rod; and Figure $4^g$ the port-closing enlargement for the end of the piston rod.

1 represents a bottle which is to be regarded as typifying any desired form of container. 2 represents the cylinder, 3 a flange which is permanently and rigidly fitted to the end of the cylinder and serves as the means for mounting the cylinder upon the container, 4 a disk, preferably of rubber, which is clamped between the screw cap 5 and the flange 3 in position to provide a cylinder head, and which is formed with an opening 6 of materially less diameter than that of the cylinder in order to provide a controllable discharge port. Cylinder 2 is provided in its side wall with one or more intake ports 7 for the fluid, and these ports are spaced above the cylinder head 4 or port 6 a distance selected to determine the capacity of that portion of the cylinder which lies below them, and which constitutes a measuring chamber 8 and determines the volume of fluid discharged at each operation of the dispensing device.

9 represents a piston fitting the cylinder 2 and (unless it is of sufficient weight to settle promptly by gravity) is pressed downwardly by a spring 10 to its seat 11 upon the inner face of the gasket or cylinder head 4, in which position it closes the discharge port 6 and hermetically seals the container. Piston 9 has a stroke upwardly at least sufficient to uncover the fluid intake ports 7, which it also controls, and it has its upward stroke imparted to it by means of a piston rod 12 extending from the piston downwardly through the discharge port 6, but of sufficiently less diameter than said port to leave ample capacity for ingress of air under upward suction of the piston or escape of fluid under downward expulsion by the piston. Upon the lower end of the piston rod 12 is an enlargement 13 of a diameter which snugly fits the discharge port 6, in a location, however, which prevents it from reaching the port 6 during the first part of the upward movement of the piston 9 and until the piston begins to uncover the fluid intake ports 7, thereby admitting air to at least the capacity of the measuring chamber 8, but thereupon closing the discharge port 6 so that continued upward movement of the piston 9, and consequent enlargement of the cylinder space which is now closed below, will be responded to as a force of suction by fluid entering through ports 7; and the length of this enlargement 13 is such that it will continue to close the port 6 until the piston reaches its upward limit, as suggested in Figure 2, at which time fluid in excess of the quantity required to fill the measuring chamber 8 will have moved in response to the suction of the piston and displaced the air from the measuring chamber into the container, and the conditions will be ready for the downward fluid trapping and positive expelling stroke of the piston. In executing this stroke, enlargement 13 continues closure of the discharge port 6 until the piston attains the approximate position of Figure 3, in attaining which the remainder of the air and excess of fluid will have escaped into the container and an accurately measured quantity of the fluid will be trapped in the measuring chamber 8. At this time, enlargement 13 opens the port 6 so that the fluid is positively expelled under the remaining portion of the downward movement of the piston in which it traverses the measuring chamber.

The operation of the device is as follows: The container is held, either manually by the user or by means of some suitable form of bracket or support, in the inverted position in which it is shown in Figure 1, and the other hand, open and palm upward, is pressed upwardly against the enlarged end 13 of the piston rod. As the piston moves upwardly and until it reaches the position shown in Figure 3 and begins to uncover the ports 7, port 6 remains open and air is drawn in. But immediately thereafter the port 6 will be closed by enlargement 13, and a volume of air equal to the capacity of the chamber 8 will have been trapped in the cylinder. Continued upward movement of the piston will now draw in fluid from the container, and this continues until the piston reaches the end of its stroke or the position of Figure 2, notwithstanding the intrusion of the enlargement 13 into the cylinder, since the enlargement 13 is materially smaller in diameter than the piston 9, and continued upward movement of the piston develops a constantly increasing space which can no longer be filled by incoming air and must be filled by fluid drawn from the container. Fluid entering the cylinder in response to suction created by the latter portion of the upward stroke of the piston 9 gravitates to the measuring chamber 8, displacing the air upward. Upon relieving the end 13 from the pressure of the hand, piston 9 moves downward under influence of spring 10, and port 6 remains closed until the piston reaches the position of Figure 3, during which time excess of fluid and any residual air will have been displaced back through the port 7 into the container. Continued downward movement opens the port 6, while piston 9 enters the measuring chamber 8, in which it fits, and forcibly expresses the accurately measured charge of fluid from said chamber, through the port 6, and into the hand of the user. At the end of the downward stroke, the piston seats upon the inner face of the gasket 4, thereby closing the opening 6 and hermetically sealing the container.

One method of cheaply producing a dispensing device embodying the operative principles above described is illustrated in Figures 4 to 4$^s$, inclusive, according to which cylinder 2 is made from a tube of celluloid having its upper end contracted and its lower side portion perforated, as at 7; an annular flange 3 of the same material is snugly fitted upon and cemented to the lower end of such tube to provide the means for mounting it in the container; the piston consists of a portion 9 of relatively thick celluloid tubing fitted snugly upon and cemented to one end of a rod 12 of celluloid; the enlargement 13 is made from a piece of celluloid tubing of the same bore but thinner section, fitted upon and cemented to the opposite end of the rod 12; a spring 10 of a diameter which causes it to find abutment against the contracted end $2^a$ of the cylinder is introduced into the cylinder above the piston 9; a rubber gasket 4 having a central port 6 is passed over the protruding piston rod and laid upon the flange 3 to provide the cylinder head; and the parts thus assembled are mounted upon the bottle by means of a centrally apertured screw cap 5 with the diaphragm secured between it and the cylinder flange.

From the description herein presented, it will be seen that the invention contemplates the use of not only a cylinder having a lateral fluid intake port and an end discharge port, spaced apart to provide a chamber between them, together with a piston reciprocating therein and alternately closing and opening said ports, but a discharge port-closing element moving with the piston and spaced therefrom in such a manner that, as the piston first begins to move, and until a desired increment of air is drawn in by the suction of the piston, the discharge port remains open, but thereupon, the discharge port is closed by the spaced enlargement in order to trap the air and simultaneously, or immediately thereafter while retaining the air and continuing the pumping or suction action of the piston, the fluid intake ports are opened so that fluid is positively drawn in by suction and caused to displace the air into the container and supply at least the measured charge of fluid to be withdrawn, after which, by maintaining closure of the discharge port during a portion of the return stroke of the piston, so remanent air and fluid in excess of the volume of the measuring chamber are displaced by the piston into the container, the intake port is closed, the discharge port opens, the piston positively discharges the measured quantity of fluid into the hand of the user, and the container is hermetically closed until the next time of use.

I claim:

1. In a dispensing device of substantially the character described, a cylinder having at one end a surrounding flange, a cap constructed to embrace said flange and thereby hold the cylinder on the container, a gasket interposed between the cap and the flange and extending radially inward from the wall of the cylinder, thereby forming a head for the cylinder, said head and the cap being provided with aligned openings constituting a discharge port for the cylinder, and a piston working in said cylinder and controlling the entrance and discharge of fluid to and from the same.

2. In a dispensing device of substantially the character described, a cylinder having at one end a surrounding flange, a cap constructed to embrace said flange and thereby hold the cylinder on the container, a gasket interposed between the cap and the flange and extending radially inward from the wall of the cylinder, thereby forming a head for the cylinder, said head and cap being provided with aligned openings constituting a discharge port for the cylinder, and a piston working in said cylinder and controlling the entrance and discharge of fluid to and from the same; said gasket being of resilient material and its head-forming portion being sustained by the cap.

Signed at Chicago, Illinois, this 9th day of July, 1926.

THOMAS J. STEPHENS.